(12) United States Patent
Gordon

(10) Patent No.: US 11,637,444 B2
(45) Date of Patent: Apr. 25, 2023

(54) SYSTEMS AND METHODS FOR CONFIGURING A SECURE COMMUNICATION LINK IN AN ELECTRIC POWER DISTRIBUTION SYSTEM

(71) Applicant: Schweitzer Engineering Laboratories, Inc., Pullman, WA (US)

(72) Inventor: Colin Gordon, Katy, TX (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 260 days.

(21) Appl. No.: 17/147,855

(22) Filed: Jan. 13, 2021

(65) Prior Publication Data
US 2022/0224151 A1    Jul. 14, 2022

(51) Int. Cl.
*H02J 13/00*    (2006.01)
*H04L 9/40*    (2022.01)

(52) U.S. Cl.
CPC .. *H02J 13/00002* (2020.01); *H02J 13/00036* (2020.01); *H04L 63/0272* (2013.01); *H04L 63/102* (2013.01); *H04L 63/104* (2013.01); *H04L 63/105* (2013.01); *H04L 63/164* (2013.01)

(58) Field of Classification Search
CPC ........... H02J 13/00036; H04L 63/0272; H04L 63/102; H04L 63/104; H04L 63/105
See application file for complete search history.

(56) References Cited

U.S. PATENT DOCUMENTS

| | | | |
|---|---|---|---|
| 7,729,276 B2 | 6/2010 | Akyol | |
| 2012/0173875 A1* | 7/2012 | Mahidhara | H04L 63/0428 |
| | | | 713/168 |
| 2018/0066860 A1* | 3/2018 | Carlson | F24F 11/77 |
| 2019/0116183 A1* | 4/2019 | Hussain | H04L 63/08 |
| 2019/0158279 A1* | 5/2019 | Chimakurthy | H04L 63/0442 |
| 2019/0173860 A1* | 6/2019 | Sankaran | H04L 63/0272 |
| 2019/0342101 A1 | 11/2019 | Hayes | |
| 2020/0106719 A1 | 4/2020 | Acharya | |
| 2020/0389499 A1* | 12/2020 | Koval | H04L 63/0823 |
| 2022/0263798 A1* | 8/2022 | Saghir | H04L 9/3066 |

FOREIGN PATENT DOCUMENTS

CN    114584973 A  *  6/2022  .......... H04L 9/3268

* cited by examiner

*Primary Examiner* — Bryan Y Lee
(74) *Attorney, Agent, or Firm* — Fletcher Yoder, P.C.

(57) ABSTRACT

A control system of an electric power distribution system includes processing circuitry and a memory having instructions that, when executed by the processing circuitry, cause the processing circuitry to perform operations that include receiving an indication of a profile, generating a connectivity association key (CAK) based on the profile, distributing a copy of the CAK to a device of the electric power distribution system, and establishing a connectivity association with the device in accordance with the profile based on a verification that the device possesses the copy of the CAK.

19 Claims, 6 Drawing Sheets

SYSTEMS AND METHODS FOR CONFIGURING A SECURE COMMUNICATION LINK IN AN ELECTRIC POWER DISTRIBUTION SYSTEM

BACKGROUND

This disclosure relates to systems and methods for adjusting a configuration of a secure communication link between different devices or component devices of an electric power distribution system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other devices of the electric power distribution system during operation of the electric power distribution system. For example, the IED may receive and/or transmit a signal and/or data in order to perform a functionality, such as to control a circuit breaker in response to electrical measurements of the electric power distribution system. In some embodiments, a secure communication link may be established between the IED and other devices of the electric power distribution system to enable the devices to securely communicate with one another. However, it may be difficult to adjust certain configurations and/or variables associated with the secure communication link.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a control system of an electric power distribution system includes processing circuitry and a memory having instructions that, when executed by the processing circuitry, cause the processing circuitry to perform operations that include receiving an indication of a profile, generating a connectivity association key (CAK) based on the profile, distributing a copy of the CAK to a device of the electric power distribution system, and establishing a connectivity association with the device in accordance with the profile based on a verification that the device possesses the copy of the CAK.

In an embodiment, a system includes an intelligent electronic device (IED) and a gateway that performs operations including receiving an indication of a profile defining a set of variables, generating a connectivity association key (CAK) based on the profile, distributing a copy of the CAK to the IED, and establishing a connectivity association with the IED based on the set of variables defined by the profile in response to a verification that the IED possesses the copy of the CAK.

In an embodiment, an intelligent electronic device (IED) of an electric power distribution system, the IED comprising a tangible, non-transitory, computer-readable medium that comprises instructions, wherein the instructions, when executed by processing circuitry, cause the processing circuitry to perform operations including receiving a first identifier of a profile, comparing the first identifier with respective identifiers of a plurality of profiles, each profile of the plurality of profiles defining a respective set of variables, selecting a selected profile from the plurality of profiles based on a match between the first identifier of the profile and a second identifier of the selected profile, and establishing a connectivity association based on a set of variables defined by the selected profile.

DETAILED DESCRIPTION

Figure 1:
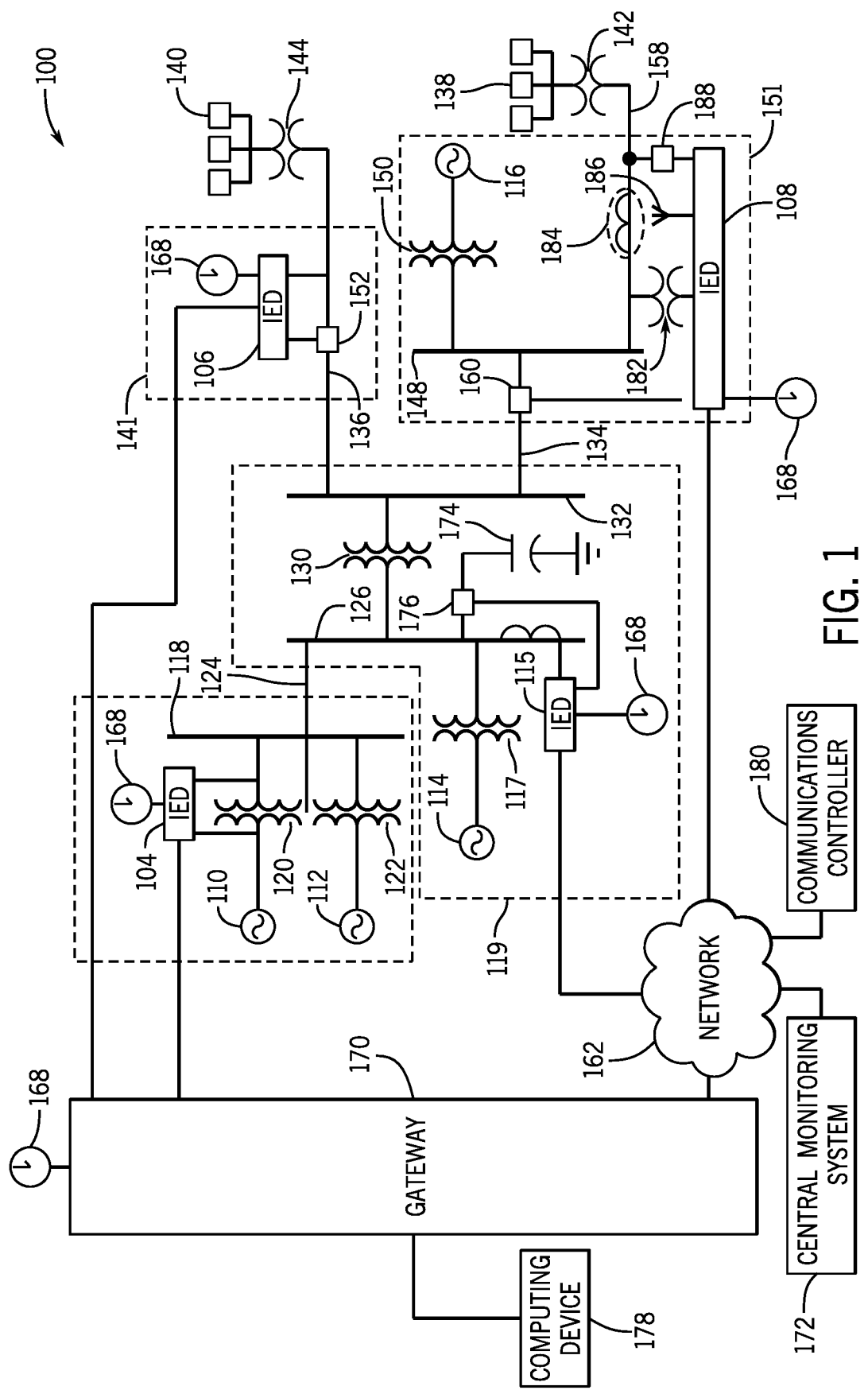
FIG. 1 is a schematic diagram of an embodiment of an electric power distribution system, in accordance with an embodiment of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to establishing a secure communication link between devices or component devices of an electric power distribution system. Intelligent electronic devices (IEDs) may be used to control certain devices and to perform certain operations of the electric power distribution system. For example, an IED may be a relay that enables or blocks electrical power flow between other devices of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of devices of the electric power distribution system. As such, the IEDs may facilitate operation of the electric power distribution system.

In some embodiments, the IEDs and/or the other devices may be communicatively coupled to one another via respective media access control security (MACsec) communication link and/or a respective MACsec key agreement (MKA) connectivity association to communicate data. To establish the MACsec communication link between devices, an MKA protocol is used to establish communication between the devices. During the MKA protocol, copies of the same connectivity association key (CAK) may be distributed to the devices via an adoption link (e.g., a link initially established based on verified identifiers of the devices, matching settings of the devices, a physical link connecting the devices). An MKA connectivity association may be established between the devices upon verification that each of the devices possesses a copy of the same CAK. Copies of the same security association key (SAK) may then be distributed to the devices via the MKA connectivity association upon verification that each of the devices possesses a copy of the same CAK. The devices may then use their respective copies of the SAK to establish a MACsec communication link for communicating with one another. For example, each of the devices may encrypt data using their copy of the SAK and/or may decrypt encrypted data using their copy of the SAK in order to transmit data securely between one another.

In some circumstances, it may be desirable to change a configuration of the connectivity association and/or the MACsec communication link. For example, it may be desirable to establish a new connectivity association having greater security or other different properties. However, in some embodiments, it may be difficult to change the configuration of the connectivity association and/or the MACsec communication link. For instance, it may be time-consuming and/or complex to configure the device settings of the IEDs and/or the other devices in order to establish a connectivity association and/or a MACsec communication link having the desired configuration. Additionally or alternatively, it may not be desirable to replace the IEDs and/or the other devices with replacement devices that include the capability of establishing a connectivity association and/or a MACsec communication link having the desired configuration. As such, it may be difficult to adjust a currently existing secure communication link to establish a new secure communication link having a specific or target configuration.

With this in mind, the present disclosure is directed to systems and methods for automatically causing device settings of different devices (e.g., of an IED) to adjust in order to establish a connectivity association and/or a MACsec communication link between the devices based on a specific configuration. In some embodiments, various profiles may be stored in the devices. Each of the profiles may define a respective set of variables for different configurations of connectivity associations and/or MACsec communication links that can be established. A device may select one of the profiles in order to establish a particular one of the connectivity associations and/or a particular one of the MACsec communication links. For example, the device may receive an indication (e.g., via a security key) of a selected profile defining a set of variables of a connectivity association and/or a MACsec communication link, and the device may automatically adjust its device settings in order to enable establishment of the connectivity association and/or the MACsec communication link in accordance with the set of variables. In this manner, a desirable configuration of the connectivity association and/or the MACsec communication link may be established without having to receive additional inputs, such as inputs that manually adjust the device settings of the device, thereby facilitating establishment of the connectivity association and/or the MACsec communication link.

Turning to the drawings, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electric power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A gateway 170 may be in communication with the IEDs 104, 106, 108, 115. The IEDs 104, 106, 108, 115 may be remote from the gateway 170 and may communicate over various media. For instance, the gateway 170 may be directly in communication with the IEDs 104, 106 and may be in communication with the IEDs 108, 115 via the communications network 162.

The gateway 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the gateway 170. The gateway 170 may receive the data and may subsequently transmit the data to an intended recipient of the data. The gateway 170 may also control data flow between one of the IEDs 104, 106, 108, 115 and another device communicatively coupled to the gateway 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the gateway 170 and/or to send data, such as a user input, to the electric power distribution system 100 via the gateway 170. Thus, the gateway 170 may enable or block operation of the electric power distribution system 100 via the computing device 178.

A communications controller 180 may interface with equipment in the communications network 162 to create an SDN that facilitates communication between the gateway 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the gateway 170 to instruct the gateway 170 to transmit certain data (e.g., data associated with a certain set of characteristics or information) to a particular destination (e.g., an intended recipient) using flows, matches, and actions defined by the communications controller 180.

In some embodiments, the gateway 170 and the IEDs 104, 106, 108, 115 may communicate with one another via a MKA connectivity association and/or a MACsec communication link. The MACsec communication link may be initiated via SAKs distributed to enable encryption and/or decryption of data. To this end, the gateway 170 or another key device (e.g., a key server) may generate and distribute keys, such as CAKs and/or SAKs, to the IEDs 104, 106, 108, 115 to establish the MKA connectivity association and/or the MACsec communication link. For instance, the gateway 170 may establish an MKA connectivity association with one of the IEDs 104, 106, 108, 115 via an MKA protocol that includes establishing an adoption link between the gateway 170 and the IED, distributing a CAK to the IED via the adoption link, establishing an MKA connectivity association with the IED based on a verified possession of the CAK, distributing an SAK to the IED via the MKA connectivity association, and communicating data with the IED using the SAK. Indeed, the gateway 170 and the IED may use identical copies of the same SAK to encrypt data to be transmitted as well as to decrypt encrypted data that has been received. Such encrypted data is transmitted via a MACsec communication link established between the device to transmit the data securely. Although the present disclosure primarily discusses the use of MKA connectivity associations and MACsec communication links to communicate data, any other suitable communication techniques may be used to communicate data between devices of the electric power distribution system 100.

It may be desirable to adjust a configuration of the secure communication link (e.g., the MKA connectivity association, the MACsec communication link) established between the gateway 170 and/or the IEDs 104, 106, 108, 115. For example, it may be desirable to adjust a variable or property of the secure communication link to change how data is communicated via the secure communication link. Thus, embodiments of the present disclosure are directed to simplifying the manner in which the configuration of a secure communication link may be adjusted.

Figure 2:
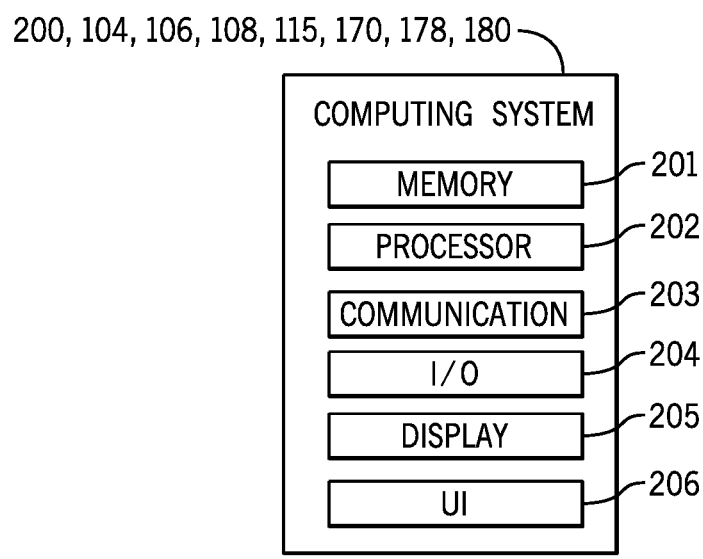
FIG. 2 is a schematic diagram of an embodiment of a computing system that may be incorporated in a device of an electric power distribution system, in accordance with an embodiment of the present disclosure of the present disclosure.

FIG. 2 is a schematic diagram of an embodiment of a computing system 200 that may be incorporated within a device of the electric power distribution system 100, such as in any of the IEDs 104, 106, 108, 115, the gateway 170, the computing device 178, and/or the communications controller or key device or 180. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication device to establish a secure communication link with another device of the electric power distribution system 100. That is, the communication system 203 enables the computing system 200 (e.g., of one of the IEDs 104, 106, 108, 115) to communication with another communication system 203 of another computing system 200 (e.g., of the gateway 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the gateway 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the gateway 170.

Figure 3:
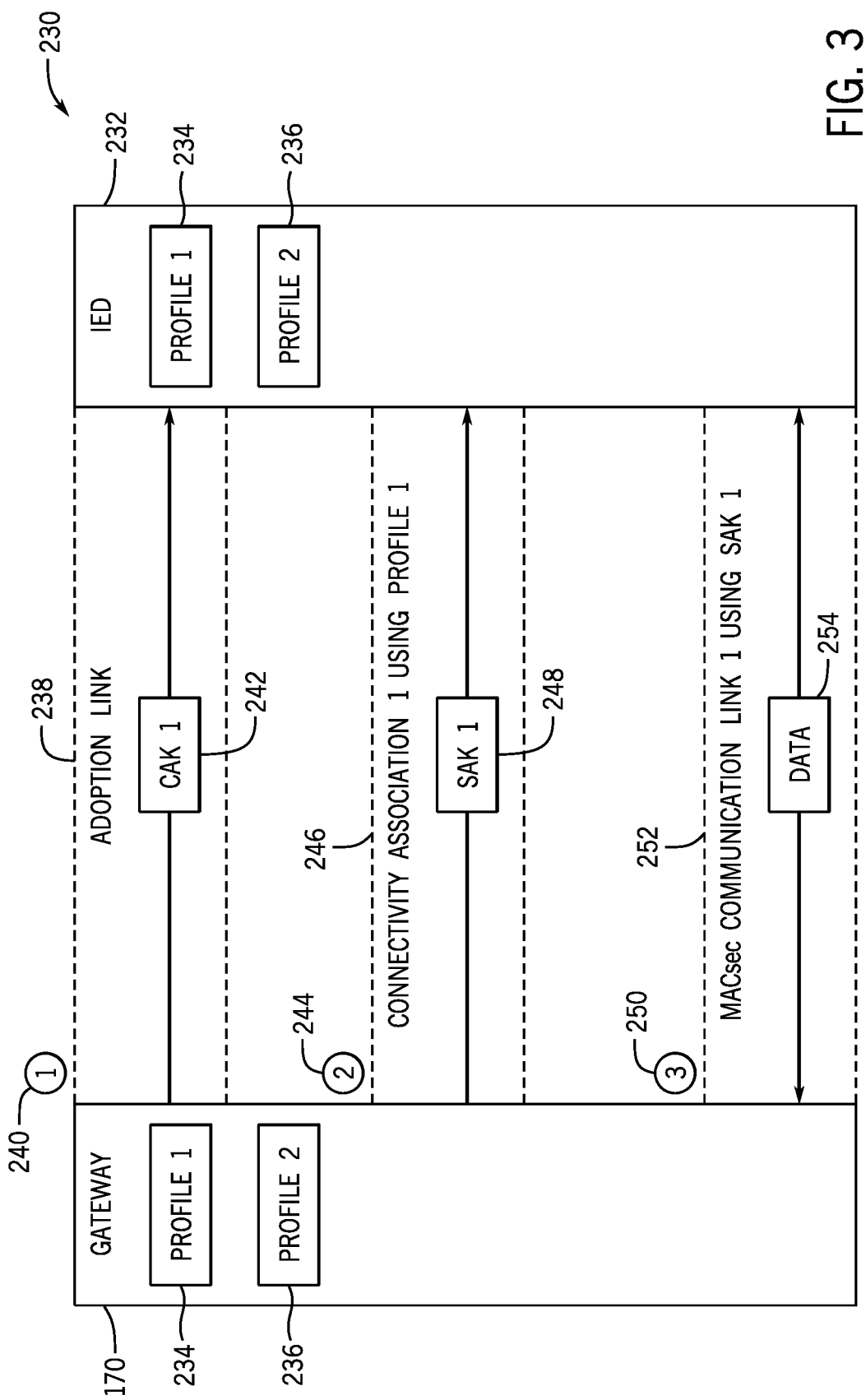
FIG. 3 is a schematic diagram of an embodiment of a procedure for establishing a secure communication link between a gateway and an intelligent electronic device (IED) in accordance with a profile, in accordance with an embodiment of the present disclosure of the present disclosure.

FIG. 3 is a schematic diagram 230 illustrating an embodiment of a procedure for establishing a secure communication link (e.g., a MACsec communication link) between the gateway 170 and an IED 232 (e.g., one of the IEDs 104, 106, 108, 115) in accordance with a profile. A similar procedure may alternatively be performed to adjust a configuration of a secure communication link between any devices of the electric power distribution system 100, such as between individual IEDs. In the illustrated embodiment, each of the gateway 170 and the IED 232 may store a first profile 234 and a second profile 236. Each of the first profile 234 and the second profile 236 may indicate information (e.g., variables) of the secure communication link to be established so as to implement a specific configuration of the secure communication link. For example, each profile 234, 236 may correspond with a cipher suite that may be synchronized during performance of the MKA protocol to establish the specific configuration of the secure communication link. Each profile 234, 236 may define variables associated with the properties of an MKA connectivity association and/or of a MACsec communication link established by the gateway 170 and/or the IED 232 via the MKA protocol. Such variables may include a delay for receiving data, a network infrastructure identity, an MKA lifetime, an MKA ether type, key server priority values, a verification communication or notification upon establishing a connectivity association, a MACsec cipher suite strength, a confidentiality enablement, a MACsec ether type, another suitable variable, or any combination thereof. In some embodiments, the profiles 234, 236 may be created by a user (e.g., an operator, a technician) and stored into the firmware of the gateway 170 and the IED 232 such that the profiles 234, 236 are readily available for implementation during operation. By way of example, a respective file may define values for the different variables of each profile 234, 236. Although the profiles below will be discussed as files, the profiles may take any other suitable file format.

The gateway 170 and the IED 232 may initially be communicatively coupled to one another via an adoption link 238. For instance, the adoption link 238 may be established between the gateway 170 and the IED 232 based on a physical connection link between the gateway 170 and the IED 232, based on a key possessed by the gateway 170 and/or by the IED 232, based on an identifier of the gateway 170 and/or of the IED 232, and the like. At a first block 240, the gateway 170 may transmit a first CAK 242 to the IED 232 via the adoption link 238. For example, the first CAK 242 may be generated based on the first profile 234. In some embodiments, the gateway 170 may generate and transmit the first CAK 242 based on a user input, such as a user input indicating that the secure communication link is to be established in accordance with the first profile 234. In additional or alternative embodiments, the gateway 170 may generate and transmit the first CAK 242 automatically or by default. That is, the gateway 170 may generate and transmit the first CAK 242 based on the first profile 234 (e.g., a default profile) in response to determining that a secure communication link is to be established between the gateway 170 and the IED 232 and without receiving an input indicative of a particular profile with which the secure communication link is to be established.

In certain embodiments, the first CAK 242 may include a connectivity association key name (CKN) that is indicative of the first profile 234 with which the secure communication link is to be established. As an example, an identifier of the first profile 234 (e.g., a profile alias) may be incorporated and/or embedded in the CKN. The CKN may then broadcast the identifier (e.g., a number between 1 and 65,536) such that, upon receipt of the CKN, the IED 232 may determine that the first profile 234 and its associated variables are to be implemented in a secure communication link to be established with the gateway 170. For instance, the IED 232 may compare the identifier with respective identifiers indicated by a stored list of files and identify that the identifier broadcasted by the CKN matches with an additional identifier indicated by a file of the stored list of files, the file being representative of the first profile 234. The IED 232 may then implement a secure communication link in accordance with the values of the variables defined in the file representative of the first profile 234.

At a second block 244, in response to receipt of the first CAK 242 indicative of the first profile 234, a first connectivity association 246 may be established in accordance with the first profile 234. For example, the IED 232 and/or the gateway 170 may implement device settings based on the variables defined by the first profile 234. That is, using the first CAK 242, the IED 232 and/or the gateway 170 may automatically establish the first connectivity association 246 in accordance with the variables defined by the first profile 234. In this manner, the configuration of the first connectivity association 246 may be established without the gateway 170 or the IED 232 having to receive additional input, such as a user input, that manually sets or adjusts device settings to implement desirable properties of the first connectivity association 246. Further, the gateway 170 may transmit a copy of a first SAK 248 to the IED 232 via the first connectivity association 246. In certain embodiments, the first SAK 248 may be generated by the gateway 170 based on the first CAK 242 and therefore based on the first profile 234.

At a third block 250, a first MACsec communication link 252 may be established between the gateway 170 and the IED 232 via the first SAK 248. In some embodiments, the first MACsec communication link 252 may be established in accordance with the first profile 234 via the first SAK 248. For instance, the configuration of the first MACsec communication link 252 may be established based on the configuration of the first connectivity association 246 that has been established based on the variables defined by the first profile 234. The gateway 170 and the IED 232 may then transmit data 254 between one another via the first MACsec communication link 252. Indeed, the gateway 170 may use its copy of the first SAK 248 to encrypt data to be transmitted to the IED 232 via the first MACsec communication link 252, and/or the gateway 170 may use its copy of the first SAK 248 to decrypt encrypted data received from the IED 232. Further, the IED 232 may use its copy of the first SAK 248 to encrypt data to be transmitted to the gateway 170, and/or the IED 232 may use its copy of the first SAK 248 to decrypt encrypted data received from the gateway 170. In this way, the gateway 170 and the IED 232 may communicate the data 254 with one another using the first SAK 248, which may be based on the variables defined by the first profile 234.

Figure 4:
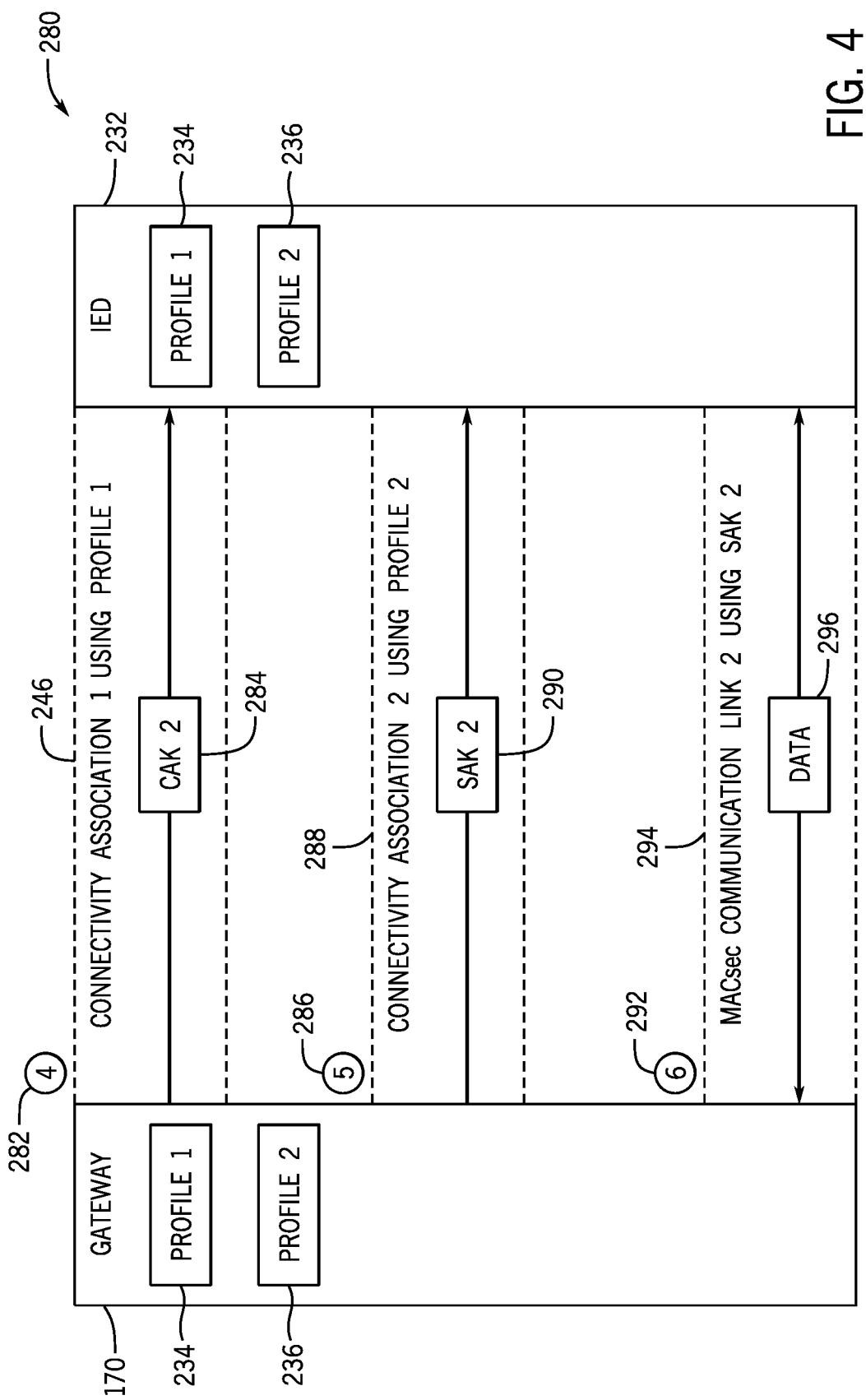
FIG. 4 is a schematic diagram of an embodiment of a procedure for changing a secure communication link between a gateway and an IED from establishment in accordance with a first profile to establishment in accordance with a second profile, in accordance with an embodiment of the present disclosure of the present disclosure.

FIG. 4 is a schematic diagram 280 illustrating an embodiment of a procedure for changing the configuration of the secure communication link between the gateway 170 and the IED 232. By way of example, the procedure illustrated by the schematic diagram 280 may be performed based on a user input (e.g., by the gateway 170, by the IED 232) indicative of a secure communication link to be established in accordance with a different profile, based on an indication made by the IED 232 without a user input, based on another user activity (e.g., an adjusted operation of a device caused by a user), in accordance to a schedule, based on a detected event (e.g., a power system event, a security event), based on sensor data (e.g., indicative of a physical interaction with a device), based on another suitable factor, or any combination thereof. In the illustrated embodiment, the procedure is performed to establish a new secure communication link in accordance with a profile (e.g., the second profile 236) that is different than the first profile 234, such as after the first connectivity association 246 has already been established. As an example, the new secure communication link may be established in order to update the cipher suite used for a previous secure communication link, such as to increase a security of communication between the gateway 170 and the IED 232, to change a manner in which the gateway 170 and the IED 232 communicate with one another, to update keys used for establishing the secure communication link between the gateway 170 and the IED 232, and so forth.

At a fourth block 282, the gateway 170 may transmit a second CAK 284 to the IED 232 via the first connectivity association 246. The second CAK 284 may be based on the second profile 236. For example, the second CAK 284 may include a CKN that incorporates and/or is embedded with an identifier of the second profile 236. Upon receipt of the CKN, the IED 232 may then determine that the second profile 236 and its associated variables are to be implemented in an updated secure communication link to be established with the gateway 170. Indeed, the IED 232 may search through its stored list of files and identify that the identifier broadcasted by the CKN matches with an identifier of another file of the stored list of files, this file being representative of the second profile 236. The IED 232 may then implement a secure communication link in accordance with the value of the variables defined in the file representative of the second profile 236.

At a fifth block 286, in response to receipt of the second CAK 284 indicative of the second profile 236, a second connectivity association 288 may be established in accordance with the second profile 236. That is, the second connectivity association 288 may replace the first connectivity association 246. In some embodiments, the IED 232 and/or the gateway 170 may automatically change the device settings that were previously implemented to establish the first connectivity association 246 in accordance with the first profile 234 in order to establish the second connectivity association 288 in accordance with the second profile 236. Thus, the IED 232 and/or the gateway 170 may automatically replace the first connectivity association 246 with the second connectivity association 288 established based on the variables defined by the second profile 236. In this manner, the configuration of the connectivity association between the gateway 170 and the IED 232 may be automatically changed without the gateway 170 or the IED 232 having to receive additional input that manually sets or adjusts device settings. The gateway 170 may then transmit a copy of a second SAK 290 to the IED 232 via the second connectivity association 288. The second SAK 290 may be generated by the gateway 170 based on the second CAK 284 and therefore based on the second profile 236.

At a sixth block 292, a second MACsec communication link 294 may be established between the gateway 170 and the IED 232 via the second SAK 290. In certain embodiments, the second MACsec communication link 294 may be established in accordance with the second profile 236 via the second SAK 290. For example, the configuration of the second MACsec communication link 294 may be established based on the configuration of the second connectivity association 288 that has been established based on the variables defined by the second profile 236. The gateway 170 and the IED 232 may then transmit data 296 between one another via the second MACsec communication link 294. The configuration of the second MACsec communication link 294 may be different than that of the first MACsec communication link 252. Thus, the data 296 transmitted via the second MACsec communication link 294 may be communicated in a different manner than the data 254 communicated via the first MACsec communication link 252.

Each of FIGS. 5 and 6 discussed below illustrates a method associated with communicating data via a secure communication link established based on a profile. In some embodiments, each of the methods may be performed by a single respective device or system, such as by the computing system 200 (e.g., the processor 202). In additional or alternative embodiments, multiple devices may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 5:
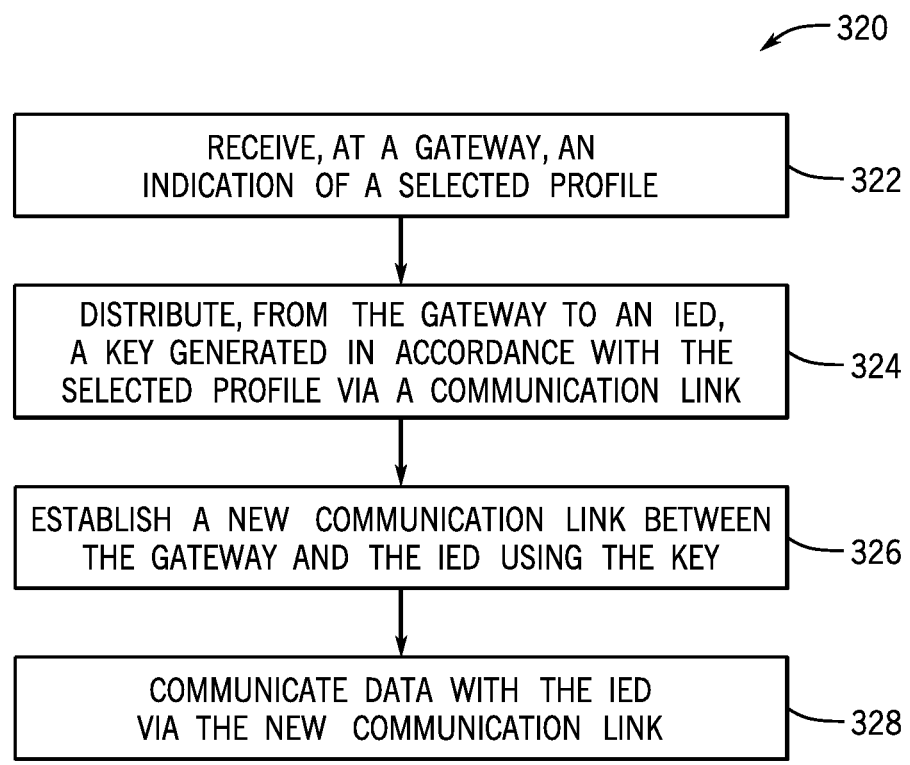
FIG. 5 is a flowchart of an embodiment of a method for changing establishment of a secure communication link between a gateway and an IED based on a selected profile, in accordance with an embodiment of the present disclosure of the present disclosure.

FIG. 5 is a flowchart of an embodiment of a method 320 for communicating data via a secure communication link established based on a selected profile. The illustrated method 320 is described from the perspective of the gateway 170 and may be performed to establish a new secure communication link and/or to update a previously established secure communication link between the gateway 170 and the IED 232. In additional or alternative embodiments, a method similar to the illustrated method 320 may be performed by another device, such as another IED. At block 322, the gateway 170 may receive an indication of a selected profile. For example, a user may interact with an interface of the gateway 170, such as to log into an account or application, to select a profile from a list of candidate profiles (e.g., presented via a display of the gateway 170).

At block 324, the gateway 170 may distribute a key to the IED 232, the key being generated in accordance with the profile selected via the procedure described with respect to block 322. In some embodiments, the key may be a copy of a CAK that includes a CKN indicative of the selected profile (e.g., an identifier of the selected profile). If a connectivity association has already been established between the gateway 170 and the IED 232, the key may be distributed via the already established connectivity association. If a connectivity association is not currently established between the gateway 170 and the IED 232, the key may be distributed via an adoption link between the gateway 170 and the IED 232.

At block 326, a new secure communication link (e.g., a new connectivity association) may be established between the gateway 170 and the IED 232 using the key based on a verification that the IED 232 possesses the copy of the CAK. In embodiments in which the key is a CAK that includes a CKN indicative of the selected profile, the CKN may be used for establishing the new secure communication link. For example, the selected profile indicated by the CKN may define certain variables (e.g., a file defining values of the variables) associated with a new connectivity association to be established. The gateway 170 may automatically adjust its device settings based on the defined variables in order to establish the connectivity association based on the variables. In some embodiments, the gateway 170 may output a notification to indicate that the new secure communication link is established in accordance with the selected profile.

At block 328, the gateway 170 and the IED 232 may communicate data with one another via the new secure communication link established in accordance with the selected profile. In some embodiments, the gateway 170 may generate an SAK based on the key that was generated based on the selected profile, and the gateway 170 may transmit a copy of the SAK to the IED 232 via the connectivity association to establish a MACsec communication link between the gateway 170 and the IED 232. The gateway 170 and the IED 232 may then use the SAK to securely transmit data via the MACsec communication link. For instance, the gateway 170 may encrypt data using its copy of the SAK and transmit the encrypted data to the IED 232 via the MACsec communication link. Further, the gateway 170 may use its copy of the SAK to decrypt encrypted data received from the IED 232.

Figure 6:
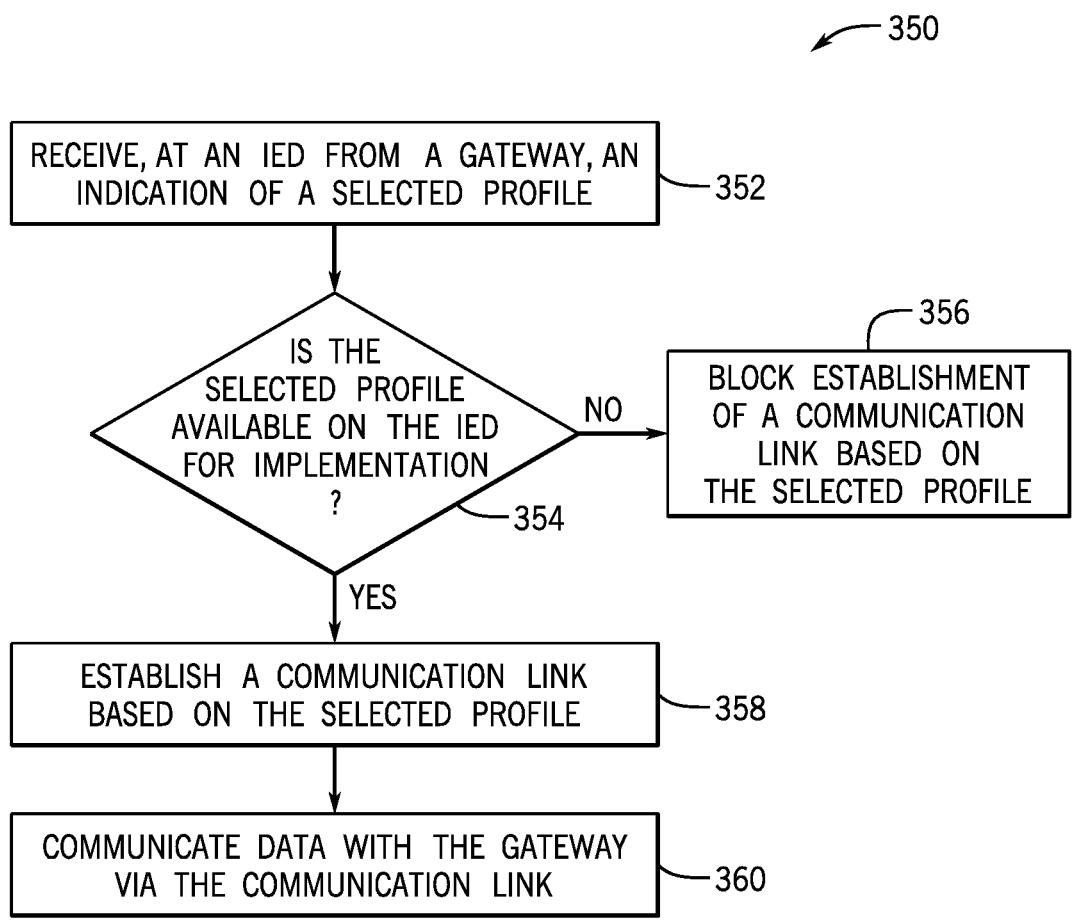
FIG. 6 is a flowchart of an embodiment of a method for changing establishment of a secure communication link between a gateway and an IED based on a selected profile, in accordance with an embodiment of the present disclosure of the present disclosure.

FIG. 6 is a flowchart of an embodiment of a method 350 for communicating data via a secure communication link established based on a selected profile. The illustrated method 350 is described from the perspective of the IED 232 and may be performed to establish a new secure communication link and/or to update a previously established secure communication link between the gateway 170 and the IED 232. Additionally or alternatively, a method similar to the illustrated method 350 may be performed to establish a secure communication link between the IED 232 and another device, such as another IED. At block 352, the IED 232 may receive an indication of a selected profile from the gateway 170. For example, the gateway 170 may transmit a CAK to the IED 232 (e.g., via an already established connectivity association, via an adoption link), and the CAK may include the CKN indicative of the selected profile.

At block 354, the IED 232 may determine whether the selected profile is available for establishment of a connectivity association. For instance, the CKN may indicate an identifier associated with the selected profile, and the IED 232 may store multiple different profiles (e.g., respective files representative of the different profiles) that are each associated with a respective identifier. The IED 232 may compare the identifier associated with the selected profile of the received CKN with the respective identifiers of the stored profiles so as to determine whether the identifier associated with the selected profile matches with one of the respective identifiers of the stored profiles.

At block 356, in response to a determination that the selected profile is not available, the IED 232 may block establishment a new secure communication link based on the selected profile. For example, the selected profile (e.g., a file representative of the selected profile) may not have been stored in the IED 232. Accordingly, the IED 232 may determine that the identifier associated with the selected profile does not match with any of the respective identifiers of the stored profiles, and the IED 232 may not adjust its device settings to establish the secure communication link in accordance with the selected profile. As a result, a currently established secure communication link, instead of a newly established secure communication link, may continue to be maintained and used for communicating data. In some embodiments, the IED 232 may transmit a notification to indicate that a new secure communication link was not established in accordance with the selected profile.

At block 358, in response to a determination that the selected profile is available, the TED 232 may establish a new secure communication link in accordance with the selected profile. By way of example, the IED 232 may determine that the identifier associated with the selected profile of the received CKN matches with one of the respective identifiers of the stored profiles (e.g., matches with an identifier indicated by a file representative of one of the stored profiles). As a result, the IED 232 may adjust its device settings (e.g., based on the values of the variables defined by the file) and may establish the secure communication link based on its adjusted device settings. In certain embodiments, the IED 232 may transmit a notification to indicate that the new secure communication link is established in accordance with the selected profile.

At block 360, the IED 232 and the gateway 170 may communicate data with one another via the new secure communication link established in accordance with the selected profile. For instance, the IED 232 may receive a copy of an SAK from the gateway 170 to establish a MACsec communication link between the IED 232 and the gateway 170. The IED 232 may then use its copy of the SAK to encrypt data to be transmitted to the gateway 170 via the MACsec communication link. Further, the IED 232 may use its copy of the SAK to decrypt encrypted data received from the gateway 170.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A gateway of a control system of an electric power distribution system, the gateway comprising: processing circuitry; and a memory comprising instructions that, when executed by the processing circuitry, are configured to cause the processing circuitry to perform operations comprising: receiving an indication of a profile; generating a media access control security (MACsec) connectivity association key (CAK) based on the profile; distributing a copy of the CAK to a device of the electric power distribution system; and establishing a connectivity association with the device in accordance with the profile based on a verification that the device possesses the copy of the CAK, wherein the gateway is configured to perform operations comprising: receiving an additional indication of an additional profile, wherein the additional profile defines an additional set of variables; generating an additional CAK based on the additional profile; distributing a copy of the additional CAK to the IED; and establishing an additional connectivity association with the IED based on the additional set of variables defined by the additional profile in response to a verification that the IED possesses the copy of the additional CAK, wherein the additional connectivity association replaces the connectivity association.

2. The gateway of claim 1, wherein the profile defines a set of variables, and the instructions, when executed by the processing circuitry, are configured to cause the processing circuitry to adjust device settings of a gateway of the electric power distribution system based on the profile to establish the connectivity association in accordance with the set of variables.

3. The gateway of claim 1, wherein the instructions, when executed by the processing circuitry, are configured to cause the processing circuitry to generate the CAK to include a connectivity association key name (CKN) indicative of the profile.

4. The gateway of claim 1, wherein the instructions, when executed by the processing circuitry, are configured to cause the processing circuitry to perform operations comprising: generating a security association key (SAK) for the connectivity association based on the CAK; and transmitting a copy of the SAK to the device via the connectivity association to establish a media access control security (MACsec) communication link with the device.

5. The gateway of claim 4, wherein the instructions, when executed by the processing circuitry, are configured to cause the processing circuitry to use the SAK to encrypt data to be transmitted via the MACsec communication link, use the SAK to decrypt encrypted data received via the MACsec communication link, or both.

6. The gateway of claim 1, wherein the instructions, when executed by the processing circuitry, are configured to cause the processing circuitry to perform operations comprising: distributing the copy of the CAK to the device via a previously established connectivity association with the device; and establishing the connectivity association with the device in accordance with the profile to replace the previously established connectivity association.

7. The gateway of claim 1, wherein the instructions, when executed by the processing circuitry, are configured to cause the processing circuitry to receive the indication of the profile via a user input.

8. A system, comprising: an intelligent electronic device (IED); and a gateway configured to perform operations comprising: receiving an indication of a profile, wherein the profile defines a set of variables; generating a media access control security (MACsec) connectivity association key (CAK) based on the profile; distributing a copy of the CAK to the IED; and establishing a connectivity association with the IED based on the set of variables defined by the profile in response to a verification that the IED possesses the copy of the CAK, wherein the gateway is configured to perform operations comprising: receiving an additional indication of an additional profile, wherein the additional profile defines an additional set of variables; generating an additional CAK based on the additional profile; distributing a copy of the additional CAK to the IED; and establishing an additional connectivity association with the IED based on the additional set of variables defined by the additional profile in response to a verification that the IED possesses the copy of the additional CAK, wherein the additional connectivity association replaces the connectivity association.

9. The system of claim 8, wherein the IED is configured to perform operation comprising: receiving the copy of the CAK distributed by the gateway; identifying the profile based on the CAK; and establishing the connectivity association with the gateway based on the set of variables defined by the profile.

10. The system of claim 9, wherein the IED is configured to store a plurality of profiles, each profile of the plurality of profiles defines a respective set of variables, and the IED is configured to identify the profile from the plurality of profiles based on the CAK.

11. The system of claim 10, wherein the CAK comprises a connectivity association key name (CKN) indicative of an identifier of the profile, and the IED is configured to perform operations comprising: comparing the identifier of the profile with respective identifiers of the plurality of profiles; and identifying the profile from the plurality of profiles based on the identifier of the profile matching with a respective identifier of one of the plurality of profiles.

12. The system of claim 8, wherein the gateway is configured to perform operations comprising: receiving an additional indication that a communication link is to be established between the IED and the gateway, wherein the additional indication is not associated with any profile; generating an additional CAK based on a default profile in response to the receipt of the additional indication, wherein the default profile defines an additional set of variables; distributing a copy of the additional CAK to the IED; and establishing an additional connectivity association with the IED based on the additional set of variables in response to a verification that the IED possesses the copy of the additional CAK.

13. The system of claim 8, wherein the set of variables comprises a property of the connectivity association, a property of a media access control security (MACsec) communication link established between the IED and the gateway based on the connectivity association, or both.

14. An intelligent electronic device (IED) of an electric power distribution system, the IED comprising a tangible, non-transitory, computer-readable medium that comprises instructions, wherein the instructions, when executed by processing circuitry, are configured to cause the processing circuitry to perform operations comprising: receiving a media access control security (MACsec) connectivity association key (CAK) from a gateway, wherein the CAK is associated with a first identifier of a profile; comparing the first identifier with respective identifiers of a plurality of profiles, wherein each profile of the plurality of profiles defines a respective set of variables; selecting a selected profile from the plurality of profiles based on a match between the first identifier of the profile and a second identifier of the selected profile; and establishing a MACsec connectivity association with the gateway based on a set of variables defined by the selected profile, wherein the gateway is configured to perform operations comprising: receiving an additional indication of an additional profile, wherein the additional profile defines an additional set of variables; generating an additional CAK based on the additional profile; distributing a copy of the additional CAK to the IED; and establishing an additional connectivity association with the IED based on the additional set of variables defined by the additional profile in response to a verification that the IED possesses the copy of the additional CAK, wherein the additional connectivity association replaces the connectivity association.

15. The IED of claim 14, wherein the instructions, when executed by the processing circuitry, are configured to cause the processing circuitry to block establishment of the connectivity association based on the set of variables defined by the selected profile in response to a mismatch between the first identifier of the profile and the respective identifiers of the plurality of profiles.

16. The IED of claim 14, wherein the instructions, when executed by the processing circuitry, are configured to cause the processing circuitry to perform operations comprising: storing a plurality of files, wherein each file is representative of one of the plurality of profiles and defining values for the respective set of variables of the one of the plurality of profiles; selecting a file of the plurality of files based on the match between the first identifier of the profile and the second identifier of the selected profile, wherein the file is representative of the selected profile; and establishing the connectivity association based on the values of the set of variables and defined by the file.

17. The IED of claim 14, wherein the instructions, when executed by the processing circuitry, are configured to cause the processing circuitry to adjust a device setting of the IED to establish the connectivity association based on the set of variables defined by the selected profile.

18. The IED of claim 14, wherein the instructions, when executed by the processing circuitry, are configured to receive the first identifier of the profile from the connectivity association key (CAK) transmitted via an adoption link or a previously established connectivity association.

19. The IED of claim 14, wherein the instructions, when executed by the processing circuitry, are configured to cause the processing circuitry to perform operations comprising: receiving a security association key (SAK) via the connectivity association to establish a media access control security (MACsec) communication link; and using the SAK to communicate data via the MACsec communication link.

* * * * *